(12) United States Patent
Kussmaul et al.

(10) Patent No.: US 11,514,124 B2
(45) Date of Patent: Nov. 29, 2022

(54) PERSONALIZING A SEARCH QUERY USING SOCIAL MEDIA

(71) Applicant: International Business Machines Corporation, Armonk, NY (US)

(72) Inventors: Timo Kussmaul, Boeblingen (DE); Uwe K. Hansmann, Tuebingen (DE); Kai Brennenstuhl, Boeblingen (DE); Andreas Prokoph, Boeblingen (DE); Thomas Steinheber, Maihingen (DE)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 16/445,258

(22) Filed: Jun. 19, 2019

(65) Prior Publication Data

US 2020/0401639 A1    Dec. 24, 2020

(51) Int. Cl.
*G06F 16/9536*  (2019.01)
*G06F 16/332*   (2019.01)
*G06F 16/33*    (2019.01)
*G06F 16/31*    (2019.01)
*G06F 16/9535*  (2019.01)

(52) U.S. Cl.
CPC ........ *G06F 16/9536* (2019.01); *G06F 16/328* (2019.01); *G06F 16/3329* (2019.01); *G06F 16/3349* (2019.01); *G06F 16/9535* (2019.01)

(58) Field of Classification Search
CPC ............. G06F 16/9536; G06F 16/3329; G06F 16/9535; G06F 16/328; G06F 16/3349
See application file for complete search history.

(56) References Cited

U.S. PATENT DOCUMENTS

| 7,788,260 | B2 | 8/2010  | Lunt          |
|-----------|----|---------|---------------|
| 8,356,046 | B2 | 1/2013  | Hille-Doering |
| 8,538,959 | B2 | 9/2013  | Jin           |
| 8,688,691 | B2 | 4/2014  | Ahmed         |
| 8,966,440 | B2 | 2/2015  | No            |
| 9,489,462 | B1 | 11/2016 | Spertus       |
| 9,971,839 | B1 | 5/2018  | Spertus       |

(Continued)

OTHER PUBLICATIONS

"Create a Personalized web search Application based on user profile interests", Stack Overflow, printed on Apr. 25, 2019, 4 pages, <https://stackoverflow.com/questions/21454380/create-a-personalized-web-search-application-based-on-user-profile-interests>.

(Continued)

*Primary Examiner* — James Trujillo
*Assistant Examiner* — Michal Bogacki
(74) *Attorney, Agent, or Firm* — Randy E. Tejeda

(57) ABSTRACT

The invention relates to a method for personalizing a search of a search service. The search service comprises a search index with content items of a search type being used as first search results for first search queries issued by the client application and providing second search queries to be executed for retrieving second search results to be returned in reply to the first search queries. The method comprises using social media content items retrieved from social media services for extracting a set of keywords comprised by the social media content items. A second search query modified, wherein the modifying comprises adding keywords of the set keywords as additional search parameters of the determined second search query.

20 Claims, 6 Drawing Sheets

(56) References Cited

U.S. PATENT DOCUMENTS

| | | | | |
|---|---|---|---|---|
| 2012/0117059 | A1* | 5/2012 | Bailey | G06F 16/9535 707/723 |
| 2012/0185497 | A1 | 7/2012 | Doganata | |
| 2013/0018916 | A1* | 1/2013 | Busch | G06F 16/319 707/771 |
| 2013/0086057 | A1* | 4/2013 | Harrington | H04L 51/32 707/732 |
| 2014/0280067 | A1* | 9/2014 | Ganti | G06F 16/219 707/722 |
| 2015/0106157 | A1* | 4/2015 | Chang | G06Q 30/0201 705/7.29 |
| 2015/0161130 | A1* | 6/2015 | Liu | G06F 16/93 707/723 |
| 2015/0363485 | A1* | 12/2015 | Bennett | G06F 16/951 707/694 |
| 2016/0203238 | A1* | 7/2016 | Cherniavskii | G06F 16/90332 707/722 |
| 2017/0097986 | A1* | 4/2017 | Zhu | G06F 16/3326 |
| 2017/0277790 | A1* | 9/2017 | Alonso | H04L 67/306 |
| 2018/0349500 | A1* | 12/2018 | Tremblay | G06F 16/9535 |
| 2019/0138660 | A1* | 5/2019 | White | G06F 16/90332 |
| 2019/0205474 | A1* | 7/2019 | Pawar | G06F 16/438 |

OTHER PUBLICATIONS

Estes, Brittany, "How to Integrate Search Platforms with Content Management Systems", Aug. 16, 2018, 12 pages, <https://www.webdevelopmentgroup.com/2017/08/how-to-integrate-search-platforms-with-content-management-system/>.

Ma et al., "Interest-Based Personalized Search", The University of Utah, ACM Transactions on Informational Systems, vol. 25, No. 1, Article 5, Publication date: Feb. 2007, © 2007 ACM, 38 pages, <https://www.cpp.edu/~zma/research/Interest-Based%20Personalized%20Search.pdf>.

Mell et al., "The NIST Definition of Cloud Computing", NIST National Institute of Standards and Technology U.S. Department of Commerce, Special Publication 800-145, Sep. 2011, 7 pages.

* cited by examiner

PERSONALIZING A SEARCH QUERY USING SOCIAL MEDIA

BACKGROUND

The present disclosure relates to the field of electronic data processing and, more particularly, to personalizing a search of a search service.

Client applications, also referred to as search-based applications, may rely on a search service to identify and retrieve required information for the functionality of the client application, like content and navigation elements. The client application sends, during runtime, search queries to the search service and retrieves the required information, e.g., for rendering application views from search results of the search queries. The application views and presents the content and navigation elements retrieved from the search service to a user of the client application.

SUMMARY

Embodiments of the present invention provide a method for personalizing a search of a search service as well as a computer program product and a computer system for executing the method as described by the subject matter of the independent claims. Advantageous embodiments are described in the dependent claims. Embodiments of the present invention can be freely combined with each other if they are not mutually exclusive.

In one aspect, the invention relates to a method for personalizing a search of a search service. The search service comprises a search engine and a search index. The search index comprises content items of a search query type for use as first search results for first search queries received from a client application. The content items of the search query type comprise second search queries for use by the search service to search for second search results to be returned to the client application as search results for the first search queries. A personalization component is provided configured for retrieving one or more social media content items from one or more social media services.

The method comprises retrieving one or more social media content items from the one or more social media services by the personalization component. The personalization component forwards the retrieved social media content items to a content analyzing service configured for extracting keywords from the social media content items. The personalization component receives a set of one or more keywords extracted from the social media content items from the content analyzing service. A content item of the search query type comprising a second search query to be modified using the set of keywords is determined, e.g., by the personalization component. The personalization component may use the search service for determining the content item of the search query type. The determined second search query is modified, e.g., by the personalization component. The personalization component may use an authoring service for the modifying of the determined second search query. The modifying comprises adding one or more keywords of the set keywords as additional search parameters of the determined second search query. The modified second search query is stored as a content item of the search query type in the search index of the search service e.g., by the personalization component. The personalization component may use the authoring service for the storing of the modified second search query.

In a further aspect, the invention relates to a computer program product comprising a non-volatile computer-readable storage medium having computer-readable program code embodied therewith for personalizing a search of a search service. The search service comprises a search engine and a search index. The search index comprises content items of a search query type for use as first search results for first search queries received from a client application. The content items of the search query type comprise second search queries for use by the search service to search for second search results to be returned to the client application as search results for the first search queries. A personalization component is provided configured for retrieving one or more social media content items from one or more social media services.

The personalizing of the search of the search service comprises retrieving one or more social media content items from the one or more social media services by the personalization component. The personalization component forwards the retrieved social media content items to a content analyzing service configured for extracting keywords from the social media content items. The personalization component receives a set of one or more keywords extracted from the social media content items from the content analyzing service. A content item of the search query type comprising a second search query to be modified using the set of keywords is determined, e.g., by the personalization component. The personalization component may use the search service for determining the content item of the search query type. The determined second search query is modified, e.g., by the personalization component. The personalization component may use an authoring service for the modifying of the determined second search query. The modifying comprises adding one or more keywords of the set keywords as additional search parameters of the determined second search query. The modified second search query is stored as a content item of the search query type in the search index of the search service e.g., by the personalization component. The personalization component may use the authoring service for the storing of the modified second search query.

In a further aspect, the invention relates to a computer system for personalizing a search of a search service. The search service comprises a search engine and a search index. The search index comprises content items of a search query type for use as first search results for first search queries received from a client application. The content items of the search query type comprise second search queries for use by the search service to search for second search results to be returned to the client application as search results for the first search queries. A personalization component is provided configured for retrieving one or more social media content items from one or more social media services.

The computer system comprises a processor and a memory storing machine-executable program instructions. Executing the program instructions by the processor causes the processor to control the computer system to retrieve one or more social media content items from the one or more social media services by the personalization component. The personalization component forwards the retrieved social media content items to a content analyzing service configured for extracting keywords from the social media content items. The personalization component receives a set of one or more keywords extracted from the social media content items from the content analyzing service. A content item of the search query type comprising a second search query to be modified using the set of keywords is determined, e.g., by the personalization component. The personalization component may use the search service for determining the content item of the search query type. The determined second search query is modified, e.g., by the personalization component. The personalization component may use an authoring service for the modifying of the determined second search query. The modifying comprises adding one or more keywords of the set keywords as additional search parameters of the determined second search query. The modified second search query is stored as a content item of the search query type in the search index of the search service e.g., by the personalization component. The personalization component may use the authoring service for the storing of the modified second search query.

DETAILED DESCRIPTION

Figure 1:
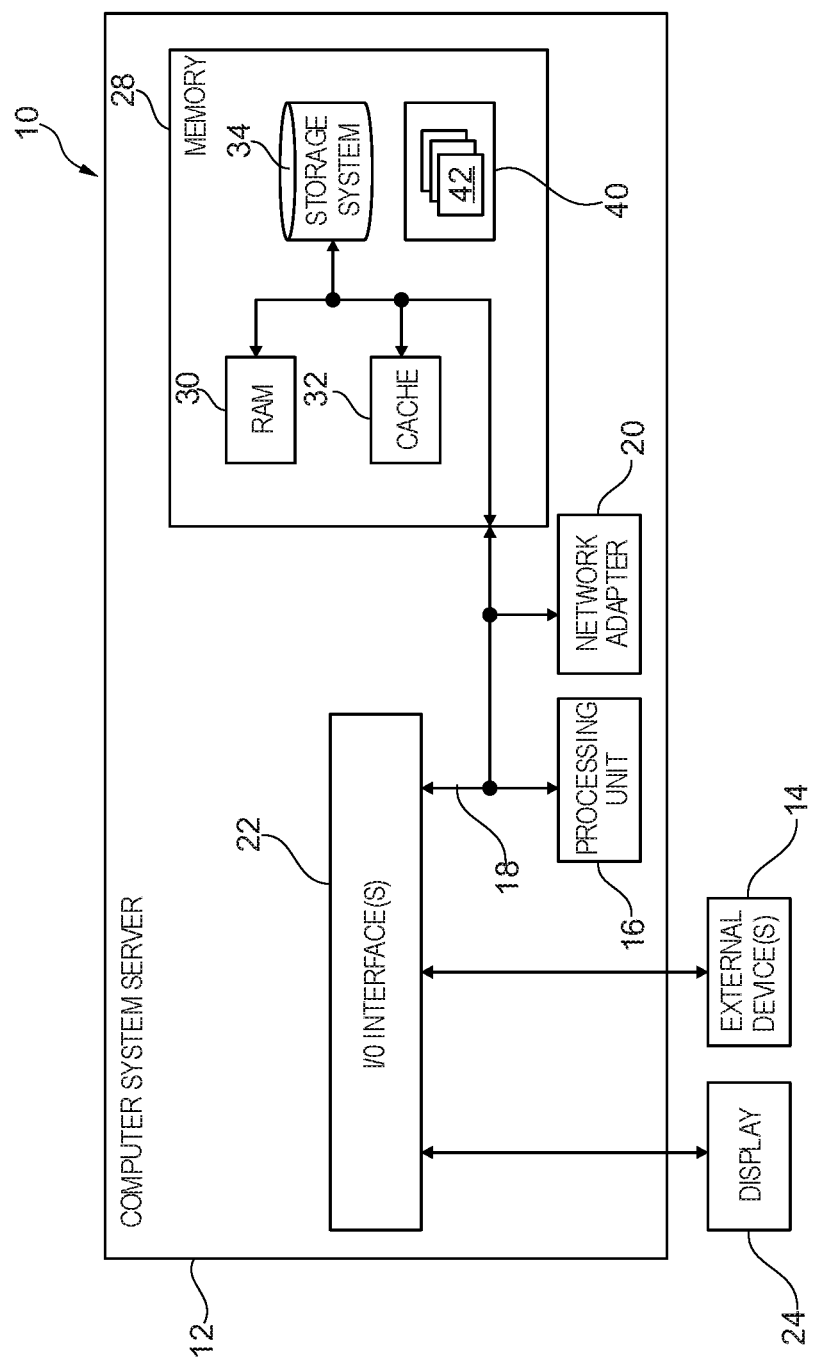
FIG. 1 is a schematic diagram illustrating an exemplary cloud computing node according to an embodiment, in accordance with an embodiment of the present invention.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of using social media content items, e.g., related to social media activities of a user, to provide a better understanding of what a user is interested in and what the user might be looking for. This insight may be used to personalize searches executed by a search service in order to improve search results, e.g., by finding and ranking search results according to user individual preferences and needs.

Embodiments may allow to use the insight gained from the social media content items to automatically enhance, adapt, and/or extend a user interface of a search-based application program of a user, e.g., content items and/or menu items that are shown in a view of the search-based application program. This adaption may be implemented by adapting search queries, more precisely second search queries, that are used for determining elements of the user interface to be displayed according to the interests of the user. Embodiments require a user to opt in or opt out of retrieving, storing, utilizing, and/or exposing personal information (e.g., social media, etc.). Using social media content items from social media sources, interests of a user may be inferred from a social graph of the user, from social activities of the user, and/or from other user context data, e.g., geolocation and/or languages, as well as from context data of users connected with the respective user in the social graph.

Embodiments may have the beneficial effect of providing a user understanding at a deeper level by learning preferences of the user and/or improving satisfaction of the user. A search service may be enabled using content items provided by a search index to find search results for a search query which meets individual preferences and needs of the user. Search results may be ranked and presented in a way to highlight more relevant results, i.e., results related to individual user preferences, relative to less relevant results, i.e., unrelated results.

The resulting keywords provided by the content analyzing service may be used to automatically adapt second search queries to boost relevant content items higher in a search results list. According to embodiments, a search-based application program using the pattern, according to embodiments to retrieve user interface elements, may receive results ranked according to the inferred interests, emotions, and characteristics of a user. Thus, the user experience of the search-based application program may take into account individual interests, emotions, and characteristics of the user. Thus, embodiments may have the beneficial effect of enhancing a user experience of a search-based application program, improve user confidence and user productivity as well as lower maintenance and support costs. According to embodiments, the method works automatically without requiring modifications and/or code changes in the respective client search-based application program.

In a situation where the user has recently tweeted about a personal area of interest, it may be more likely for the user to be interested and search for content related to this personal area of interest than for unrelated content. Therefore, search results related to the personal area of interest of the user may be boosted in a search result list in order to better meet the individual preferences and needs of the user. For this purpose, personalized search queries may be used.

According to embodiments, the personalization component may use a monitoring component to monitor social media activities of user. Embodiments may have the beneficial effect of enabling a search service to follow social media activities of a user, i.e., take these activities into account, by analyzing relevant sources provided by social media services, similar communities, and blogs. To further improve the search results, the user may be enabled to provide the search service access to non-public content on those social media services. This non-public content may only be used for determining personal preferences of the user, in order to improve searches performed for the same user on other content items. Using linguistic analysis tools, current areas of interests may be extracted from social media activities of the user. Furthermore, emotions of the user, like anger, disgust, fear, joy, or sadness, as well as social propensities of the social media activities performed, like openness, conscientiousness, extroversion, agreeableness, and emotional range, may be determined. Social media activities, may, e.g., comprise posting, tweeting, liking, disliking, following, subscribing, sharing, and/or linking content items, i.e., social media content items, using a social media service.

The resulting areas of interest, personal characteristics and/or emotions related to these areas may be used in combination with a frequency and/or up-to-dateness of social media activities related to these areas for calculating boosting factors for search queries. Boosting factors may be used (e.g., in form of boost sub-queries) to boost search results relating to personal areas of interest of the user relative to unrelated search results. A boosting factor may be provided in form of a numerical factor assigned to a keyword searched for, e.g., in a sub-query, and defining a relative boosting of search results comprising the respective keyword over search results not comprising the respective keyword.

Embodiments, for example, may be used to boost search results of a search service provided by a content management system. A content management system may, e.g., provide a web shop and manage searches executed finding products and/or services provided by the web shop. Using boosting factors for boosting search results related to personal areas of interests of a user may provide the user with a better shopping experience.

According to embodiments, the content analyzing service is a cognitive content analyzing service. Cognitive content analyzing services take into account data analysis human cognitive processes influencing the way information is generated, shared, received, and/or processes by humans. When information is provided by a user using social media services, the information comprised by a resulting social media content item, like a posting, and perceived by other users may, e.g., comprise contextual information, emotions, and/or personal characteristics important for the resulting inter-human communication between the posting and the receiving user. By taking into account human cognition for the analysis of data, a cognitive content analyzing service may be able to provide analysis results which better meet the needs of users using the respective service. Cognition refers to mental actions and/or processes of acquiring knowledge and understanding through thought, experience, and senses. A cognitive content analyzing service may, e.g., use machine learning, natural language processing, speech recognition, natural language translation, image analysis and recognition, audio analysis, data analytics, tradeoff analytics, personality insights, sentiment analysis, question answering, etc. for analyzing data e.g., social media content items. Thus, contextual information such as meaning, syntax, time, location, appropriate domain, regulations, user profile, process, task, mood, and goal may be understood, identified, and extracted from a data source. For example, large, unstructured datasets may be processed. Content to be analyzed using a cognitive content analyzing service may be extracted using content extraction, like, e.g., speech recognition, optical character recognition, closed captioning extraction, object recognition, or the like. Machine learning may, e.g., use deep learning algorithms and neural networks to process information.

Embodiments may have the beneficial effect of providing a method for personalizing searches of search services using social media services. The personalized searches may be used by a client application, i.e., a search-based application, to retrieve content items provided to a user in the form of an application view on a user interface. The personalization takes into account information regarding preferences and interests of a user gained from social media content items.

According to embodiments, the search service and the personalization component are provided by a content management system, wherein the content management system further provides an authoring service which enables creating and editing content items managed by the content management system, wherein the authoring service is used for the modifying of the determined second search query. Embodiments may have the beneficial effect that the second search queries may be managed by the content management system as content items of a specific type enabling a personalization of searches using personalized versions of second search queries independent of the first search queries issued by the client application.

Embodiments may have the beneficial effect that by modifying the second search queries, i.e., the search results of the first search queries, the functionality of the search-based application may be influenced without requiring a code change in the search-based application.

According to embodiments, the search-based application may not contain hardcoded search queries. Instead the search queries to retrieve data used by the search-based application, such as content items, are managed in the content management system. For this purpose, a second search query may be represented as a content item or a set of content items of a specific content type, i.e., the search query type. This allows a content author to use the normal authoring functionality to create and edit second search queries, which are handled like content items by the content management system.

Embodiments may have the beneficial effect that search queries, i.e. the second search queries, used by a search-based application are not hardcoded in the application code as defined by an application developer during development of the respective search-based application or provided in a properties file which is part of the respective application. Thus, the second search queries used for retrieving content items for the search-based application are changeable without modifying the application. In order to be able to use modified search queries a user is not required to update or redeploy a modified version of the application comprising the modified search queries on a client device.

In a service-oriented software architecture, a service refers to a software component which provides an application programming interface (API) configured to be accessible or invokable by other services or software components using a standard protocol or a standard invocation mechanism. A service may be implemented, created, removed, deployed, started, and stopped independently of other services.

An API refers to a set of predefined methods of communication among software components. An API may comprise a set of subroutine definitions, communication protocols, and/or tools for building software. Thus, an API may provide a set of building blocks which may be combined for developing computer programs. An API specification defining an API may, e.g., comprise specifications for routines, data structures, object classes, variables, and/or remote calls.

In a service infrastructure, multiple instances of one service may be running in order to improve fault tolerance, throughput, and load balancing of service requests. Each of the instances of the service may provide the same APIs and the same functionality. Each of the instances may be based on the same implementation, e.g., code, docker image and/or deployment artefact.

An interaction of a first service with a second service may comprise sending a service request for invoking an operation of one of the APIs provided by the second service. A service request may comprise an identifier of the requested API operation, e.g., in form of an URL or another parameter. In addition, a service request may comprise further data relevant for processing the service request.

A service infrastructure may comprise at least one service registry providing functionality for a service discovery and/or service lookup. A service registry may manage information about active, i.e., running, services of the service infrastructure. Before a first service invokes a second service, the first service may send a lookup request to the service registry containing a set of one or more criteria for selecting the second service, such as a service name and/or service identifier. A service name may be hardcoded in an implementation of the first service. Upon receipt of the lookup request, the service registry may select a service instance which adheres to the specified one or more criteria specified by the lookup request and return information about the selected service instance to the first service. The respective information may comprise an address, e.g., an URL, hostname, IP address and/or port, for use by the first service to create and send an invocation request to the second service. In case there is no service satisfying the one or more criteria specified by the lookup request, the service registry may return an error message.

A service registry may maintain information about a status and/or health of each service instance and consider only healthy services for service discovery requests, i.e., service lookup requests. In case a service instance becomes unresponsive and/or unhealthy, the service registry may no longer provide an address and/or information about the respective service instance to other services. The service registry may further incorporate a load balancing algorithm for distributing load between service instances, e.g., using random choice, round robin, and/or least connections.

A service may register at the service registry, e.g., immediately after starting. The registering may for example comprise sending a registration request including an address of the service to be registered. The registration request may further comprise data like, e.g., a service identifier and/or a set of identifiers of one or more APIs provided by the service to be registered. The service registry may, e.g., regularly, invoke a health check, e.g., in form of a status request, on each registered service. The invoked service may respond by returning status information. The status information may, e.g., comprise a flag indicating whether the respective service is healthy or unhealthy. If the returned status indicates a problem or if a service does not respond in time, the service registry may flag the respective service as unhealthy.

According to embodiments, a service registry may select a service instance based on two simple criteria: a binary flag representing a health status of the respective service and a service identifier, like, e.g., a service name.

A services infrastructure may be built using cloud computing. A computing component of the cloud may be separated from the Internet, e.g., by a firewall. An API gateway may provide access to client applications, i.e., client application programs, like mobile applications executed on a mobile communication device, e.g., a smartphone, to desktop applications executed on desktop computers, scripts executed in a browser, etc. An API gateway may receive requests issued by client applications and create a service lookup requests using the client requests. The service lookup requests may be sent to the service registry by the API gateway. In response to sending the service lookup requests, the API gateway may receive one or more addresses of service instances to be invoked and send invocation requests to the respective service instances. In response to sending the invocation requests, the API gateway may receive responses from the respective service instances and create one or more responses to the client request using the responses received from the service instances. The responses created by the API gateway may be returned to the requesting client applications.

While processing a request received from an API gateway, a service instance may need to invoke another service. For this purpose, the service instance may prepare a lookup request, send the prepared lookup request to a service registry, receive in response to sending the lookup request an address of a service instance and invoke the respective service instance using the received address.

Services may use state of the art software engineering mechanisms, like, e.g., caching, persistent storage, session and state management, connection, and thread pooling, etc. For example, caching may improve performance. A computer system may cache, i.e., store in a cache memory, data that was recently used, e.g., while processing recent requests. Since requests may be distributed between service instances, individual service instances may have different cache entries. In other words, the state of a service instance may depend on an individual usage history of the respective service instance. Service performance may depend on whether data relevant for processing a request is available in a cache memory assigned to the respective service or not. Thus, service performance for processing the same request may differ between individual service instances. It is therefore preferable to intelligently select service instances for processing a request.

A service performance may depend on the data in a cache memory assigned to the respective service. However, there may be no standard for sharing detailed information about cache contents between service instances and service registries. Thus, this information may not be available during service lookup, e.g., for selecting a particular service instance.

A service infrastructure and a service implemented therein, like, e.g., a search service, may serve multiple users and multiple tenants. A tenant refers to a group of users, e.g., a company, who share a common access with specific privileges to a software instance, i.e., a service instance. The service infrastructure and implemented service may ensure that tenant specific data assigned to a particular tenant is isolated from other tenants. Client requests and service requests may comprise a tenant identification identifying a tenant which is associated with the respective requests. The tenant identification may enable the service infrastructure component to establish a context and state required for processing the respective requests.

A content management system (CMS) may manage a creation of digital content items, such as text documents, webpages, images, videos, code scripts, etc. A content management system may support multiple users in a collaborative environment. Modern enterprise-scale content management systems may be based on separate content authoring and content delivery systems. Thereby, different requirements of content creation and retrieval tasks may be met. A process responsible for creating, modifying, and editing content may take place in the authoring system and be referred to as authoring. A process responsible for transferring content from the authoring system to the delivery system may be referred to as publishing. A content is either transferred as it is, e.g., text, video, images, static files, or in a transformed formed, e.g., in pre-render templates.

A content management system may provide an authoring user interface for editing and managing content items. A content management system may be configured as a headless CMS, i.e., may not provide a visual user interface, but rather provide a set of APIs, which may be called by client applications to create, edit, and retrieve content items.

This may allow a client application to provide a user interface and functionality for content authoring as well as to invoke APIs to create, edit and retrieve content items.

An authoring system may allow content authors to create, edit and manage content items. The authoring system may include an authoring user interface or may just provide authoring APIs. Furthermore, the authoring system may allow to upload or import files.

A content management system may further provide a publishing system configured for publishing content items from the authoring system to a delivery system or component, like a content delivery network (CDN), to make the content available to the public. The publishing system may also incorporate further functionalities, like indexing content items in a search index, modifying, transforming, or pre-rendering content items, etc. Publishing may be started manually by a content author, may be invoked on schedule or may be invoked via a publishing API operation.

A content management system may provide a functionality to define different types of content items. For example, the content management system may provide a predefined list of possible content item types. The type of a content item may, e.g., be selected by the user using an authoring system or component. The content management system may represent and store the content item type as a specific field in the content item. The respective field may, e.g., be named "type" or "classification." For example, a content management system may provide the following predefined content item types: "content," "asset", "page", "page template". A content management system and client applications, which retrieve and use the content items, may handle content items of different type separately. For example, a client application may use a first content item of type "page" to render a view of a page.

A content management system may be deployed in a cloud environment and implemented as a set of interacting services. An API gateway may provide an API to application programs, like, e.g., client application, authoring application, etc. and forward requests and responses between the respective applications and the services provided by the content management system.

A content management system may comprise a search service component or may alternatively use a search service external to the content management system. An authoring system may allow content authors to search for content items, a publishing system may index published content items in a delivery search index, thereby allowing client applications to search for content items. The authoring system may index content items in an authoring index, when a content item is created, updated, or deleted. The publishing system may index content items during publishing. As part of publishing, the publishing system may further update a configuration of the search index and invoke a learning to rank method in a training mode in order to recalculate a ranking model.

End users may rely on a search service to find a certain content in the website, like, e.g., products in a web shop. Furthermore, content management system client applications may use the search to lookup content to be rendered and content for establishing, e.g., a page hierarchy for navigation. Therefore, search quality and relevance ranking of search results may be important for end users as well as for an operator of a website.

A search service may provide functionality for searching in unstructured data, like, e.g., text documents. For this purpose, a search service provides functionality to create a search index by indexing content items, i.e., data to be searched, like, e.g., text documents. A search index may contain a representation of a data content to be searched, in a representation which is suited, e.g., improved, for processing by the search service. The search service may provide an application programming interface API for indexing content items, which makes the respective content items searchable by the search service. Furthermore, the search service may provide a query API allowing a client, e.g., another service or an application, to issue a search query. A search query may contain a set of query parameters specifying search criteria for searching content items, like, e.g., a set of search terms. The search service may process the query by selecting and ranking a set of content items according to a search query. The ranking may determine a scoring or an order of the respective content items relative to the search query, which represents for each of the content items a level of relevance in relation to the respective search query. A search query may also contain parameters for controlling the ranking, like, e.g., a ranking query, a boost query, and/or a boost function. Furthermore, or alternatively, a search service may automatically select one or more heuristics and/or parameters for a search ranking. A search ranking may for example be based on statistics about the search index and the search terms used for a search. Furthermore, the search ranking may be based on statistics of an occurrence of search terms in specific content items.

For a ranking, e.g., the tf-idf method (term frequency-inverse document frequency) may be used, which is a numerical statistic intended to reflect an importance or relevance of a word for a document in a search index. Tf-idf values may be used in a search service as weighting factors in ranking relevancy of a document relative to a given search query. An tf-idf value increases proportionally to the number of times a word appears in a document and is offset by the frequency of appearance of the word in the search index.

A search service may manage multiple search indexes, e.g., assigned to multiple tenants. Thus, a search service may be used in a multi-tenant environment, e.g., by creating a separate search index for each tenant. In this case, search client services may be required to select the correct search index to use for search requests depending on a tenant context.

A search index may be associated with a specific search configuration, consisting of multiple configuration parameters defining settings which control search functionality, behavior and, e.g., the structure of the content items in a search index. Search configuration parameters may be updatable and/or changeable via a search service API or by uploading a set of configuration parameter changes, e.g., in form of one or more configuration files, to the search service, a file system or a persistent storage the search service is using.

A headless content management system may be used to support a programming model for client applications, herein referred to as search-based applications or search-based application programs. Search-based applications rely on a search service to identify and retrieve contents, navigation information, site structures and/or page structures, etc. that are required for the functionality of the respective application. For example, during runtime a client application may send a series of search queries to a search service and retrieve information required for rendering the current view of the application from the search query responses. In contrast to other programming models, the application may, e.g., not use databases, file systems or other persistency components for managing this information. In order to support the search-based application, the content management system may provide the search service for the search-based application.

Content authors may use the content management system to edit information that is relevant for the search-based applications, like site structures, page structures, navigation structures, and contents, as well as assets, like images, videos, etc. Using this information, content authors may further create new pages, author new content, define new content types and/or define new page types. A modified site may be reviewed, approved, and subsequently published using the content management system. A CMS publishing component used for publishing may index the data in a search service. Therefore, when the publishing is completed, the data may be available to search-based applications through interfaces of the search service.

A search-based application may rely on sending search queries to a search service to retrieve content and the navigation elements to be presented to a user. User interface components may be used for rendering information, like, e.g., page headers and page footers for rendering a page, site maps, trees, menus, or links for rendering the site structure or navigation structure, etc. This way, layout aspects may be separated from the content, site structure and navigation structure.

According to embodiments, the retrieved social media content items may be added as content items to be managed by the content management system. Embodiments may have the beneficial effect of extending the data content managed by the content management system to cover social media content items. Thus, also the social media content items become searchable by the search service taking advantage a two-phase search pattern comprising first and second search queries in order to implement personalized search queries.

According to embodiments, the content management system further comprises the content analyzing service, e.g., a cognitive content analyzing service. The content analyzing service is configured for a data analysis of a data content provided by content items, e.g. social media content items.

According to embodiments, the content analyzing service uses a concept extraction method for extracting the set of keywords, wherein the set of keywords represents characteristic semantic aspects of the retrieved social media content items. Embodiments may have the beneficial effect that by using a concept extraction method, also referred to as concept mining, concepts may be provide extracted from the social media content items using, e.g., machine learning and statistics, such as data mining and text mining. The concepts may represent characteristic semantic aspects which can be used as keywords.

According to embodiments, the content analyzing service uses an image tagging method for extracting the set of keywords. Embodiments may have the beneficial effect of enabling a keyword extraction also for images comprised by the social content items. Image tagging provides tags, i.e., keywords, assigned to an image or a piece of an image and providing textual meta-information about the image and/or the content of the image. Tags may already be provided by the respective social media content item, e.g., generated by the user or the social media service. Alternatively, tags may be generated by the content analysis service, e.g., using automatic image analysis and recognition methods, like object recognition. For example, image analysis comprising extracted feature vectors and training annotation words may be used by machine learning techniques to implement an automatic tagging of images.

According to embodiments, the content analyzing service uses a label extraction method for extracting the set of keywords. Labels provide textual meta-information about the data content of social media content items. Embodiments may have the beneficial effect of taking into account labels provided by the social media content items in order to determine keywords.

According to embodiments, the content analyzing service uses a topic extraction method for extracting the set of keywords. Embodiments may have the beneficial effect of identifying topics the social content items relate to and enabling a usage of those topics for extracting keywords. For example, extracted topics may be used as keywords. Thus, a set of keywords may be gained which express interests of a user.

In order to extract topics from social media content items, contextual relevant data elements comprised by the social media content items may be separated from contextual not or less relevant data elements such as format specifications. This may result in a set of unstructured data elements, e.g. an unstructured plain text. The unstructured data elements may be arranged in categories, i.e., categorized, resulting in a structured categorization of topics comprised by the respective social media content items. Terms identifying and/or representing the respective topics, i.e. categories, may be used as keywords. According to embodiments, keywords for all categories may be extracted. According to other embodiments, keywords may be extracted for the most relevant categories, e.g., categories comprising the most data elements.

For the categorization, a topic ontology, i.e., a hierarchical knowledge structure comprising a vocabulary of terms and defining relationships between terms, may be used. The respective ontology may be predefined or generated, e.g., using machine learning.

According to embodiments, the content analyzing service uses a tone analysis method for extracting the set of keywords. Embodiments may have the beneficial effect of enabling a determination of emotions expressed by and/or related to the social media content items. A tone analyzer service may use linguistic analysis to detect emotional and language tones in written text. The tone may be analyzed at document as well as sentence level. A tone analyzer service may be used to identify emotions of a user, e.g., anger, disgust, fear, joy, and/or sadness, e.g., using postings and/or tweets the respective user made. Thus, a set of keywords may be gained which express emotions of a user.

According to embodiments, the content analyzing service uses personality insights for extracting the set of keywords. Personality insights may provide intrinsic personality characteristics of a user expressed, e.g., in social media content items created by the respective user. Embodiments may have the beneficial effect of enabling an identification of social propensities of postings and/or tweets a user made, e.g. openness, conscientiousness, extroversion, agreeableness, and/or emotional range. Thus, a set of keywords may be gained which express characteristics of a user.

A personality insight service may provide an application programming interface for deriving insights into personality of a user from social media, enterprise data, and/or other digital communications. The personality insight service may use linguistic analytics to infer intrinsic personality characteristics of an individual user from digital communications such as email, text messages, tweets, and forum posts. The service may infer, e.g., from potentially noisy social media, portraits of individuals that reflect their personality characteristics. Furthermore, consumption preferences of an individual may be determined, which indicate a likelihood to prefer various products, services, and/or activities.

Personality characteristics may, e.g., be inferred using the following primary models: Big Five personality characteristics represent a widely used model for generally describing how a person engages with the world. The model comprises five primary dimensions: agreeableness, conscientiousness, extraversion, emotional range, and openness. Each dimension may comprise facets that further characterize an individual according to the dimension.

Agreeableness describes a tendency of a person to be compassionate and cooperative toward others. Conscientiousness describes a tendency of a person to act in an organized or thoughtful way. Extraversion describes a tendency of a person to seek stimulation in the company of others. Emotional range, also referred to as neuroticism or natural reactions, refers to an extent to which emotions of a person are sensitive to the environment of the respective person. Openness refers to an extent to which a person is open to experiencing different activities. Needs describe which aspects of a product, service, or activity are likely to resonate with a person. The model may comprise twelve characteristic needs: excitement, harmony, curiosity, ideal, closeness, self-expression, liberty, love, practicality, stability, challenge, and structure. Values describe motivating factors that influence a decision making of a person. The model may include one or more of the following values: self-transcendence/helping others, conservation/tradition, hedonism/taking pleasure in life, self-enhancement/achieving success, and open to change/excitement.

Based on the personality characteristics, that are inferred from input texts, the personality insight service may further return an indication of the consumption preferences of the author. Consumption preferences indicate a likelihood of the author to pursue different products, services, and activities. The personality insight service may group the individual preferences into categories, e.g., shopping, music, movies, reading and learning, health and activity, volunteering, environmental concern, and entrepreneurship. Each category may further comprise one or more individual preferences.

According to embodiments, the content analyzing service uses a named-entity recognition method for extracting the set of keywords. Named-entity recognition (NER) is a subtask of information extraction used to locate and classify named-entity mentions in unstructured text into pre-defined categories such as the person names, organizations, locations, medical codes, time expressions, quantities, monetary values, percentages, etc. Named-entity recognition may comprise detecting names, e.g., using suitable segmentation methods, in the social media content items and classify the detected names by a type of entity the respective names refer to, e.g., person, organization, location, etc. For the classification a suitable ontology may be used for organizing categories of entities.

According to embodiments, the retrieved one or more social media content items relate to one or more social media activities of a user of the client application. According to embodiments, the retrieved one or more social media content items are a subset of social media content items related to social media activities selected using dates of the respective activities. Embodiments may have the beneficial effect of enabling a personalization of a search based on current preferences of a user. Thus, when interests of a user change over time, these changes may be taken into account by focusing on recent social media activities. According to embodiments, the retrieved one or more social media content items are a subset of social media content items related to social media activities selected using numbers of positive ratings of the respective activities. Ratings may, e.g., comprise likes, dislikes, values of a point scale, etc. assigned to the social media activities, like a posting. Positive ratings may comprise likes and values comprised by a portion of a point scale defined as positive, like an upper half or third. Embodiments may have the beneficial effect of enabling a personalization of a search based on social media items related to an individual user which are rated positive in the context of the social media service they are published and/or used.

According to embodiments, the retrieved one or more social media content items are a subset of social media content items related to social media activities selected using a clustering of users of the social media services comprising the user of the client application and associations of each of the users to the selected social media activities, wherein for the clustering a distance measure over an analysis of a social graph is used.

Embodiments may have the beneficial effect of taking into account multiple users. Users of the same cluster may be assumed to have similar preferences. Thus, social media content items related to social media activities of users of the same cluster may, e.g., be used for determining keywords identifying common preferences of all users of the respective cluster. A clustering refers to the task of grouping a set of data objects, e.g., users and/or associations of each of the users to a set of social media content items, in such a way that data objects in the same group, i.e., in the same cluster, are more similar according to one or more criteria to each other than to those data objects in clusters. A clustering may be implemented using various algorithms. The clustering may, e.g., be a connectivity-based clustering, also known as hierarchical clustering, a centroid-based clustering, like, e.g., k-means clustering, a distribution-based clustering, like Gaussian mixture model clustering, or a density-based clustering. Thus, the clustering may, e.g., be based on distances between the data objects in a specific representation of the respective data objects, dense areas of the data space, intervals, or particular statistical distributions. The clustering may be referred to as a type of unsupervised learning. Unsupervised learning refers to a branch of machine learning that learns from test data that has not been labeled, clustered, or classified. Rather than responding to feedback, unsupervised learning identifies commonalities in data provided and reacts based on a detected presence or absence of the respective commonalities in each new dataset.

Embodiments may have the beneficial effect of using a social graph to identify relations between users. A social graph depicts personal relations of users interacting with each other over the Internet, in particular using social media services. A social graph is a model or representation of a social network, mapping relation between the members of the respective social network.

In addition, the personalization component may determine a set of one or more users related to the current user, e.g., by identifying other users assigned to the same tenant and/or by analyzing a social graph of the user. The personalization component may further retrieve social media content items related to social media activities of users comprised by the respective set of users. The retrieved social media content items may be provided to the content analyzing service resulting in an extraction of additional keywords to be also used for modifying second search queries.

According to embodiments, the extracted keywords are added to the determined second search query in form of one or more boosting sub-queries comprising the additional search parameters. Embodiments may have the beneficial effect that the more extracted keywords, i.e., keywords relevant for the user, a second search result comprises, the higher it may be ranked. According to embodiments, the extracted keywords are comprised by one or more disjunctively connected sub-queries. A disjunctive connection implements a logical "or" as a truth-functional operator of a set of operands which is true if and only if one or more of its operands are true. Embodiments may have the beneficial effect that the respective disjunctively connected sub-queries may provide a boosting factor to ensure that second search results comprising more extracted keywords are ranked higher than second search results comprising fewer extracted keywords. According to embodiments, the respective keywords may be comprised by the sub-queries as search parameters assigned with numerical boosting factors, i.e., weighting factors.

According to embodiments, the additional search parameters comprised by the boosting sub-queries are assigned with boosting factors for boosting second search results matching the additional search parameters. Embodiments may have the beneficial effect that search results matching the additional search parameters in form of the determined keywords may be ranked higher.

According to embodiments, the modifying of the determined second search query further comprises adding a user identifier identifying the user of the client application. Embodiments may have the beneficial effect of assigning the modified second search query to the user identified by the user identifier.

According to embodiments, the modifying of the determined second search query may comprise depending on a scope defined for the modification adding a user identifier identifying the user of the client application or a user group identifier identifying a user group comprising the user of the client application. Embodiments may have the beneficial effect that a scope of a modification may, e.g., by the user, be restricted to a single user or valid for an entire user group comprising the respective user. According to embodiments, the first search query may comprise a user identifier of a user or a user group identifier of a user group as a keyword for identifying the personalized version of a second search query comprising the user identifier or user group identifier. The user identifier or user group identifier may be comprised by a boost sub-query as a boosting factor. Embodiments may have the beneficial effect of ensuring that a potential personalized version of the second search query is higher ranked than a non-personalized version, i.e., that a modified version taking into account information about the user derived from social media content items may be used rather than a non-modified version.

According to embodiments, the method further comprises receiving by the search service a first search query issued by the query client application. The received first search query is executed by the search service. The stored content item of the search query type providing the modified second search query is retrieved as a first search result for the received first search query. The modified second search query is executed by the search service. A set of content items is retrieved as a second search result for the modified second search query. The second search result is sent to the client application as a result of the received first search query.

The basic search-based application pattern based on second search queries provided as content items of a search query type may comprise a two-phase search process. By issuing one or more first search queries to the search service, the search-based application may retrieve content items, comprising content data, menu items, navigation elements, like links to other pages or views, to be presented to the user in an application view. The menu items and navigation elements are represented as content items in the search index, and may be managed i.e. created, read, updated, and/or deleted (CRUD), through an authoring service. The search service executes the first search queries and returns the resulting content items to the search-based application. The resulting content items may be ordered according to a ranking computed by the search service or a sub-component of the search service.

According to the two-phase search process, the search results returned to the search-based application are not the first results retrieved by the search service executing the first search queries. The process rather uses second search queries provided as content items of the search query type. These second search queries are not managed by the client application. For example, the second search queries provided by the content items of the search query type are managed by a content management system. Thus, a personalized search of the search service may be implemented by personalizing the second search queries without a requirement to modify the client application.

In order to be able to provide personalized second search queries, the first search queries issued by the client application may comprise, e.g., an application identifier identifying the client application as well as an application view identifier of a certain application view of the client application as additional search parameters. Alternatively, a second search query identifier identifying a second search query may be added as an additional search parameter. Thus, the first search queries may search for specific second search queries or second search queries assigned to the respective application and/or application view. Theses second search queries may be personalized. Personalization may comprise modifying the search parameters of the respective second search query according to user individual preferences and/or assigning the second search query to the user or a user group comprising the user by adding a user identifier identifying the user or a user group identifier identifying the user group, respectively. The first search query may as part of a boost sub-query comprise the user identifier and/or the group identifier, thus ensuring that a potential personalized version of the second search query comprising the user identifier or user group identifier is higher ranked than a non-personalized version without the respective identifiers. The first query and its execution implement the first phase.

The second phase is implemented by the second search query and its execution enabling a personalized search. The search index of the search service comprises a set of content items representing second search queries. These content items are referred to as content items of the search type and may comprise a representation of a search query in a suitable syntax, e.g., in Solr query syntax, as well as a set of keywords used for finding and/or ranking the content item. These keywords may comprise a client application identifier identifying a client application and/or a second search query identifier identifying a second search query as well as optionally a user identifier identifying a user and/or a user group identifier identifying a user group. In case the second search query is personalized for multiple users or groups of users, there may be multiple personalized versions of one second search query for different users or user groups. The second search query may be created or modified either automatically, e.g., by a tool or an automatic adaptation method, or by a content author directly editing the corresponding content item of the search query type in the authoring service. The search service may find, rank, and return a set of one or more second search queries in response to executing a first search query received from the client application.

A content management system managing the content items including the content items of the search query type may either automatically execute a top-ranked second search query and return the resulting second search result in reply to the first search query to the client application or may return a set of one or more ranked second search queries to the client application, which may execute the top-ranked second search query using the search service. The client application uses the second search results of the second search query received in reply to the first search query to render an application view. The client application may rely on the ranking of the second search results for selecting or sequencing content items, like menu items, navigation elements, etc. in the application view.

Modifying the second search query to take into account information about user individual preferences derived from social media content items may thus directly influence the user experience of the application without requiring a code change in the client application. An application view rendered using the second search result of the modified second search query may comprise the content items related to the individual preferences, without requiring the user to define those preferences explicitly. Thus, the user experience of a search-based application may be enhanced. An intuitive and easy to use method for extending and personalizing a search-based application may be provided. Furthermore, user confidence and user productivity may be improved as well as maintenance and support costs be lowered. This method may be implemented to work automatically without requiring modifications and/or code changes in the client application.

According to embodiments, the computer program product further comprises computer-readable program code configured to implement any of the embodiments of the method for implementing a personalizing of a search of a search service using social media search services described herein.

According to embodiments, the computer system further is configured to execute any of the embodiments of the method for implementing personalizing of a search of a search service using social media search services described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Implementation of embodiments of the invention may take a variety of forms, and exemplary implementation details are discussed subsequently with reference to the Figures.

The present invention will now be described in detail with reference to the Figures.

FIG. 1 is a schematic of an example of a cloud computing node. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Video Electronics Standards Association (VESA) local bus and Peripheral Component Interconnect (PCI) bus, such as e.g., PCI, PCI-X and PCIe.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
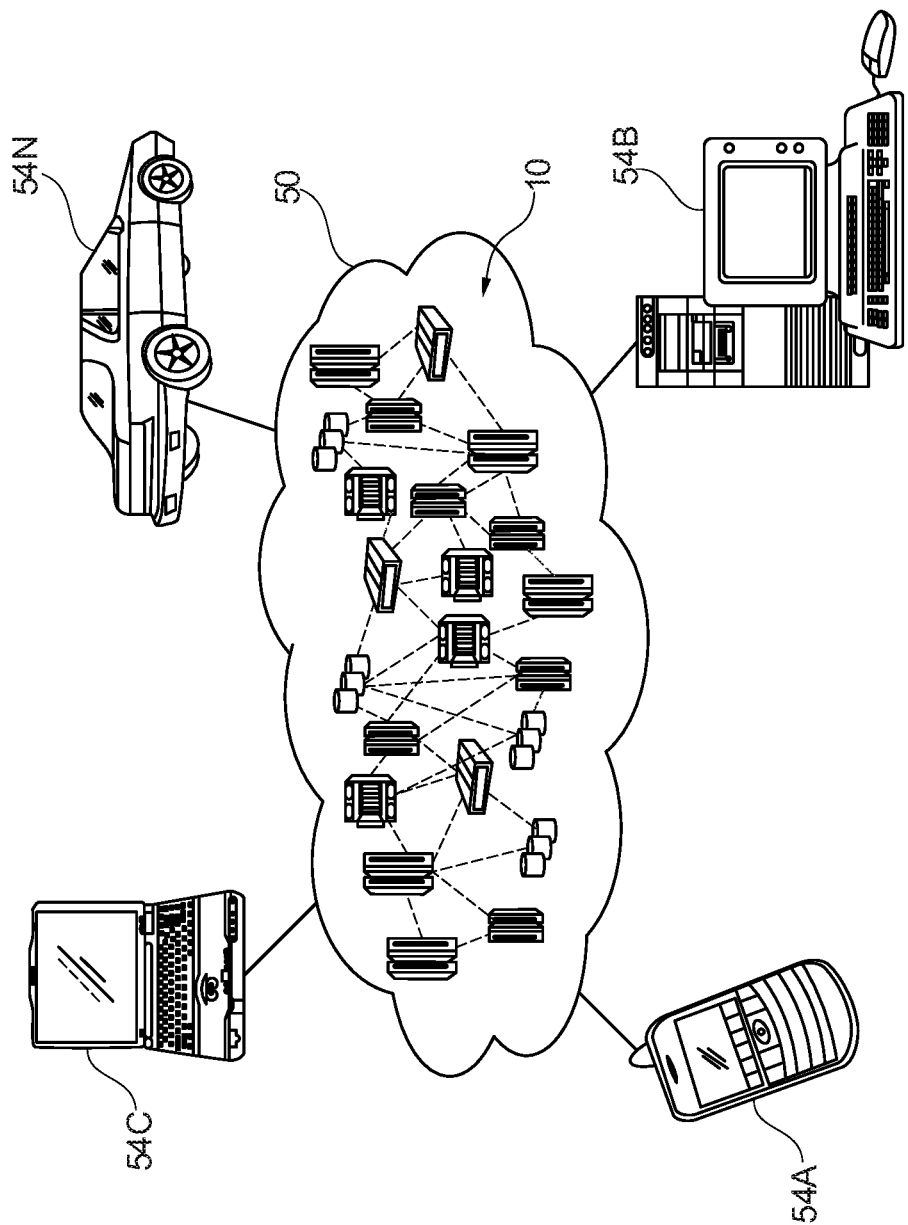
FIG. 2 is a schematic diagram illustrating an exemplary cloud computing environment according to an embodiment, in accordance with an embodiment of the present invention.

FIG. 2 depicts an illustrative cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
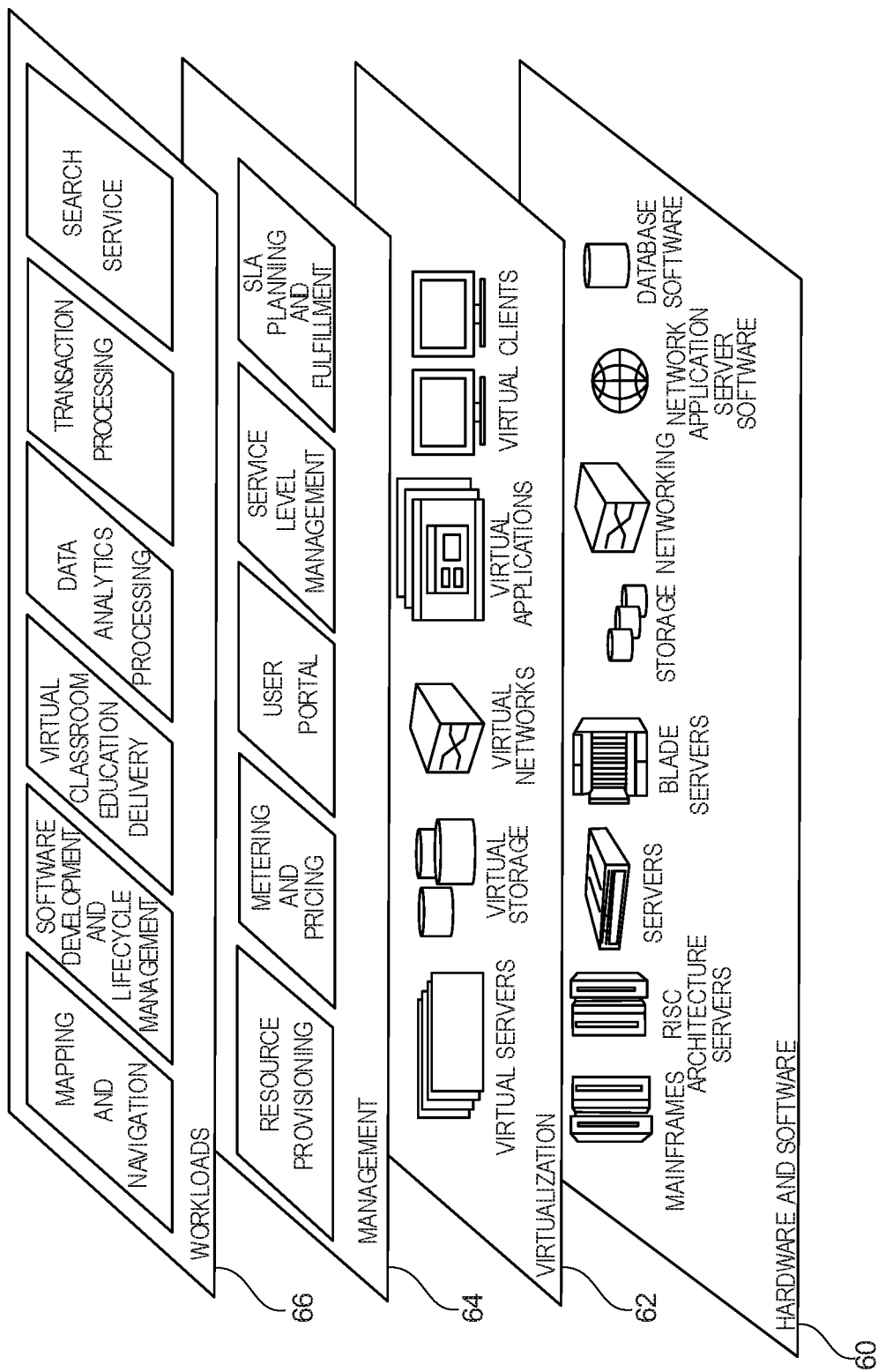
FIG. 3 is a schematic diagram illustrating exemplary abstraction model layers, in accordance with an embodiment of the present invention.

FIG. 3 depicts a set of functional abstraction layers provided by cloud computing environment 50 (FIG. 2). It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example RISC (Reduced Instruction Set Computer) architecture-based servers; servers; blade servers; storage devices; networks and networking components. Examples of software components include network application server software and database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. For example, cloud storage locations, e.g., a virtual storage of virtualization layer 62, may be provided. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. For example, the identity of a user trying to access storage locations provided by the cloud infrastructure may be verified. User portal provides access to the cloud computing environment for consumers and system administrators, e.g., access to storage locations provided by the cloud infrastructure. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; a search service, wherein means are provided for personalizing searches executed by the search service using social media search services. The search service is, e.g., provided by a content management system configured for personalizing searches executed by the search service using social media search services.

Figure 4:
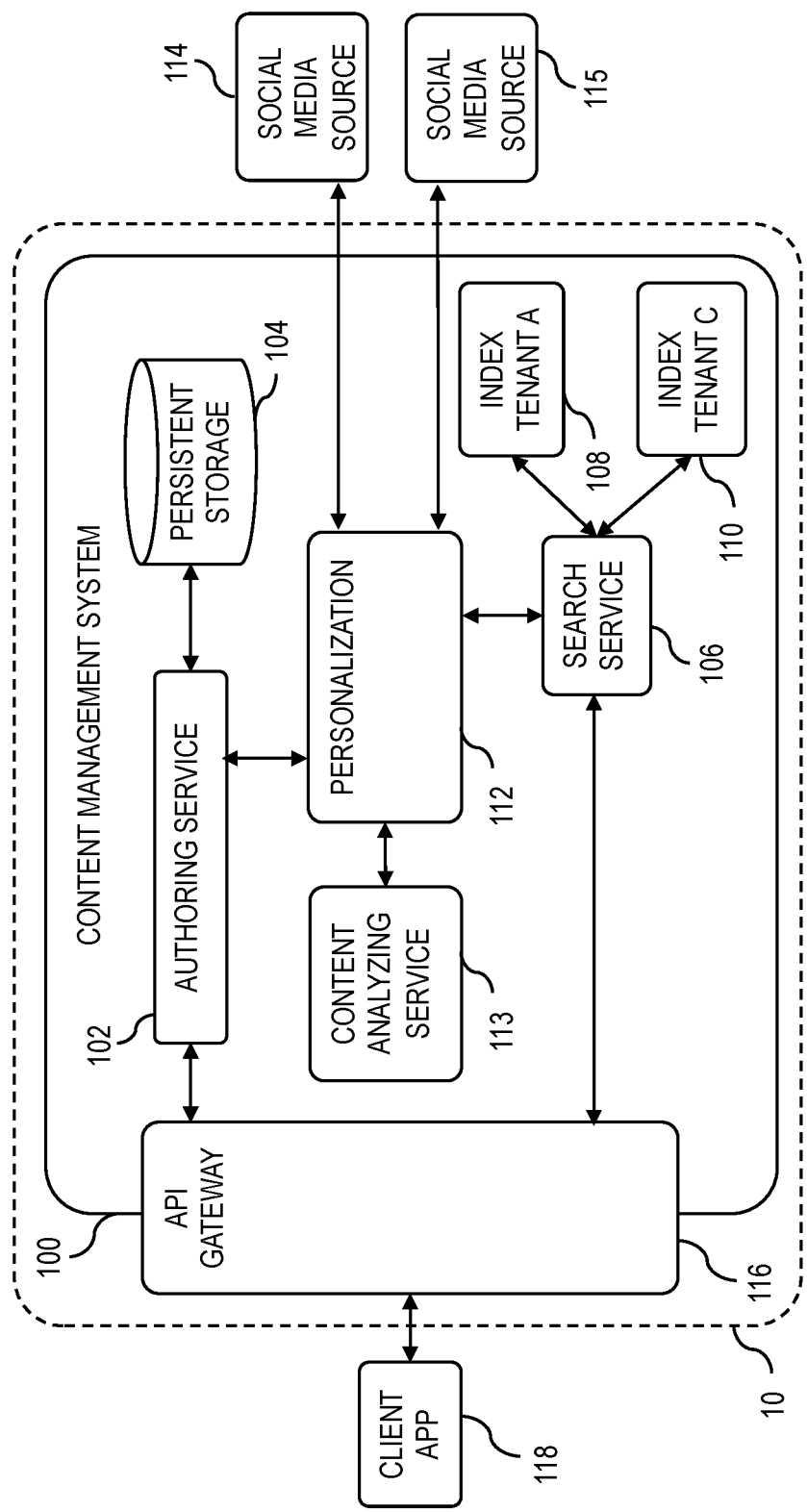
FIG. 4 is a schematic diagram illustrating an exemplary system for personalizing a search of a search service using social media services, in accordance with an embodiment of the present invention.

FIG. 4 depicts a schematic diagram illustrating an exemplary system for personalizing a search of a search service 106. The system may comprise a computer system, e.g., a cloud computing node 10, which provides a content management system 100. The content management system 100 manages digital content items, in particular a creation and modification of digital content items. Digital content items may, e.g., comprise text documents, webpages, images, videos, code scripts, etc. The content management system 100 comprises an authoring component providing authoring service 102 for creating, modifying, and editing content items managed by the content management system 100 as well as a persistent storage 104 for storing the content items created, modified, and/or edited by the authoring component.

The content management system 100 further comprises a search service 106. The search service 106 may provide a search engine, i.e., an information retrieval software program configured for information retrieval and presentation in response to search queries. The search engine is configured for searching one or more search indexes 108, 110 with content items managed by the content management system 100. The search indexes 108, 110 contain representations of data content to be searched. The representation may be configuring to improve processing of search queries. The content items comprised by the search indexes 108, 110 may, e.g., comprise content items of the search type providing second search queries. The search indexes 108, 110 may be tenant specific search indexes 108, 110, i.e., assigned to specific tenants. Depending on which tenant requests a search, the search service 106 may select one of the search indexes 108, 110 assigned to the requesting tenant. The search is then executed by the search engine according to the request using the selected search index 108, 110.

The content management system 100 comprises a personalization component 112. The personalization component 112 comprises interfaces to one or more social media sources 114, 115 for retrieving social media content items, to authoring service 102 for modifying second search queries and to a search service 106 for determining second search queries. The personalization component 112 may be configured for importing social media content items social media sources 114, 115 to the content management system for analysis.

The personalization component 112 may further comprise an interface to a content analyzing component 113 providing a content analyzing service, e.g., a cognitive content analyzing service. Alternatively, the content analyzing service may be provided as an external service provided in addition to the content management system. The content analyzing component 113 may comprise a text analysis sub-component, e.g., configured for information retrieval, lexical analysis to study word frequency distributions, pattern recognition, tagging/annotation, information extraction, data mining techniques including link and association analysis, visualization, and/or predictive analytics. The content analyzing component 113 may comprise an image recognition and/or analysis sub-component and/or a natural language processing sub-component, e.g., an entity extractor, parts of speech analyzer or tone analyzer. A tone analyzer may use linguistic analysis to detect emotional and language tones in written text. A tone analyzer may analyze a tone at document as well as sentence level. A tone analyzer may be used to identify emotions, e.g., anger, disgust, fear, joy and/or sadness, as well as social propensities of postings and/or tweets, e.g., openness, conscientiousness, extroversion, agreeableness, and/or emotional range. Thus, a set of keywords may be gained which express interests, emotions and characteristics related to a user.

The content management system 100 and more precisely the search service 106 may receive search queries, i.e., first search queries from the client application (client app) 118 via an API gateway 116. A client application 118 in form of a search-based application may rely on the search service 106 of content management system 100 to identify and retrieve content items, e.g., comprising content data, navigation information, site structures and/or page structures, etc. that are required for the functionality of the respective client application 118. For example, the client application may send during runtime a series of search queries via the API gateway 116 to the search service 106. The search service 106 executes the search queries using one of the search indexes 108, 110 assigned to the user of the client application 118. Thus, the client application 118 is enabled of retrieving information required for rendering an application views from the search results received. Thus, the client application 118 may not require a database, file system or other persistency component for managing on its own. The personalization component 112 may use a set of keywords determined by the content analyzing component 113 using social media content items extracted from the social media sources 114, 115 to personalize second search queries of the respective user by taking into account interests, emotions and characteristics related to a user.

The present invention may contain various accessible data sources that may include personal storage devices and content the user wishes not to be used, Program/utility 40 allows the user to opt in or opt out of exposing personal information. Program/utility 40 enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Figure 5:
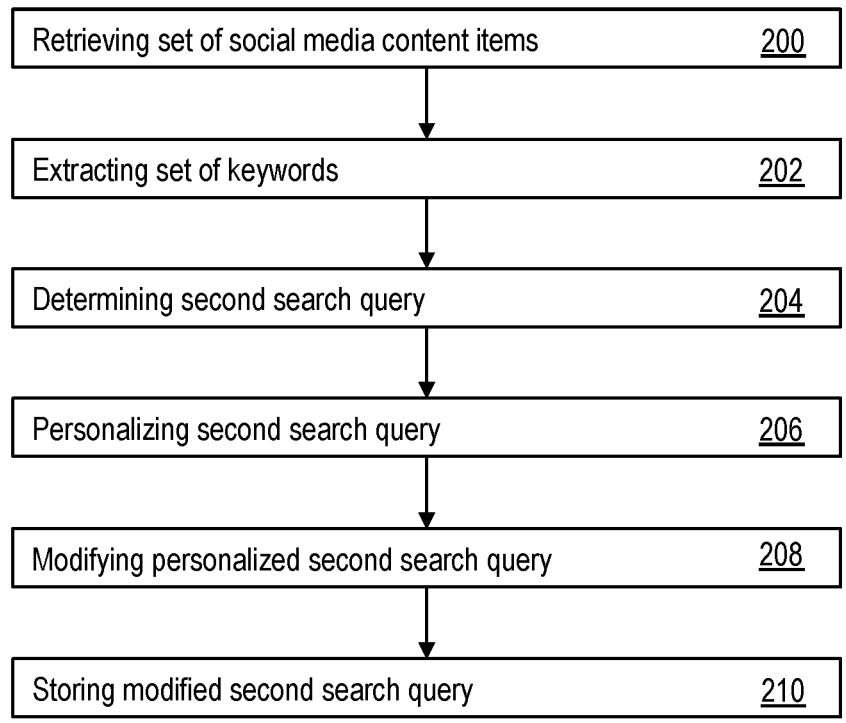
FIG. 5 is a schematic flow diagram of an exemplary method for personalizing a search of a search service using social media services, in accordance with an embodiment of the present invention.

FIG. 5 depicts a schematic flow diagram of an exemplary method for personalizing a search of a search service using social media services. In block 200, the personalization component retrieves for a given user a set of one or more social media content items from one or more social media source, e.g., using public APIs of social media services as social media sources. The user may be identified using one or more social media accounts of the user. Information regarding the social media accounts may be provided by the user. The user may further allow the personalization component to identify and crawl posts by the user on the respective social media services, blogs, communities, and/or social media platforms. The respective accounts may further be used to identify any "likes" or "dislikes" expressed by the user as well as contents/channels the user is following and/or subscribed to. The personalization component may further use a social media extractor. The social media extractor may, e.g., regularly, crawl social media accounts identified by and/or for the user as well as the contents/channels that the user follows and/or subscribed to. The social media extractor may provide the collected data to a content analyzing service, e.g., a relevant topics extractor, a tone analyzer, and/or a personality insight service. A crawler used for the crawling may be configured for traversing websites of social media courses to retrieve their content, e.g., documents, images, or videos, as social media content items.

In block 202, a set of one or more keywords is extracted from the retrieved social media content items or at least a subset of the retrieved social media content items by a content analyzing service configured for extracting keywords. The personalization component invokes the content analyzing service and forwards the social media content items to the content analyzing service for extracting. A relevant topics extractor may be used to extract relevant keywords from the crawled content. The relevant topics extractor may use a text extraction module of a contextual analysis engine. The result of the extraction performed by the relevant topics extractor may, e.g., be provided in form of a map of documents and relevant keywords assigned to the respective documents. A tone analyzer may be used to extract emotions of the user from the crawled content. For example, one or more of the following emotions may be expressed by the user in the crawled content and detected by the tone analyzer: anger, disgust, fear, joy, sadness. A personality insights service may provide insights into a personality of a user expressed by social media activities of the user, like, e.g., postings. The personality of the user may be characterized taking into account one or more dimensions of personality, e.g., agreeableness, conscientiousness, extraversion, emotional range, and openness or what the user prefers in general. The results may be summarized, e.g., using one or more of the following categories: excitement, harmony, curiosity, ideal, closeness, self-expression, liberty, love, practicality, stability, challenge, and/or structure.

As a result, the personalization component may receive a set of one or more keywords extracted by the content analyzing services, e.g., the relevant topics extractor, the ton analyzer, and/or the personality insight service, from the set of social media content items. The set of keywords comprises keywords referring to topics of interest and/or relevance of the user, i.e., the set of keywords is an individual set of keywords related to individual preferences of the respective user.

In block 204, the personalization component determines at least one second search query. The personalization component may, e.g., initiate a first search for at least one content item of a search query type providing a second search query stored as part of the search index. In response to the first search query, the personalization component may receive a search result comprising a set of one or more content items, i.e., second search queries. According to embodiments, a personalization component may search for all content items of the search query type associated with a given search-based application program which is to be personalized for the user. The searching may comprise creating and/or receiving a first search query including an identifier of the search-based application program and determining all second search queries comprising the respective identifier. According to embodiments, the personalization component may search for a set of content items of the search type associated with a given application view of a given search-based application program. In this case the respective application view is to be personalized for the user. The search-based application program may provide the first search queries used for rendering the respective application view of the search-based application program to the personalization component. The personalization component may use the first search queries provided by the search-based application program to determine content items of the search query type assigned to the respective search queries. The respective determine content items of the search query type may, e.g., comprise one or more search query identifiers identifying one or more of the first search queries provided by the search-based application program.

In block 206, the personalization component personalizes the at least one second search query. The personalization component checks each of the one or more second queries and determines whether the respective second search query is assigned to the given user, i.e. comprises a user identifier identifying the user. If this is not the case, i.e., if the respective second search query is not assigned to the user, the personalization component creates a user specific version of the respective second search query. A second search query assigned to a user may comprise the user identifier identifying the respective user. Creating a user specific version of the respective second search query may comprise copying the respective content item of the search query type providing the respective second search query and adding the user identifier identifying the user to the copy. If the second search query is already personalized for the respective user, i.e., comprises the user identifier identifying the respective user, this step may be skipped.

In block 208, the personalization component modifies the at least one personalized, i.e., user specific, second search query. The modification may comprise adding one or more sub-queries including the one or more keywords extracted by the content analyzing component. For example, the personalization component may add a set of boost queries with a boost query for each of the extracted keywords. Thus, each of the extracted keywords may be boosted. The personalization component of the content management system may take content data retrieved from the social media activities of the user and extend the personalized second search queries of the user with relevant boosting or burying factors using keywords extracted from the retrieved content data to improve the relevance of possible search results regarding interests, emotions and characteristics of the user. The individual boosting factors may be calculated to assign a higher factor to keywords mentioned in more actual social media posts, i.e. the keywords may be weighted based on their up-to-dateness.

In block 210, the personalization component stores the modified at least one second search query as a content item in a search index of the search service. For this purpose, the personalization component may, e.g., invoke an authoring service API to update the respective content item of the search type providing the respective second search query. The authoring service may index the updated content item in the search service, e.g. in the search index assigned to the respective user. Alternatively, an additional content item of the search type providing the personalized and modified second query may be created and stored.

Figure 6:
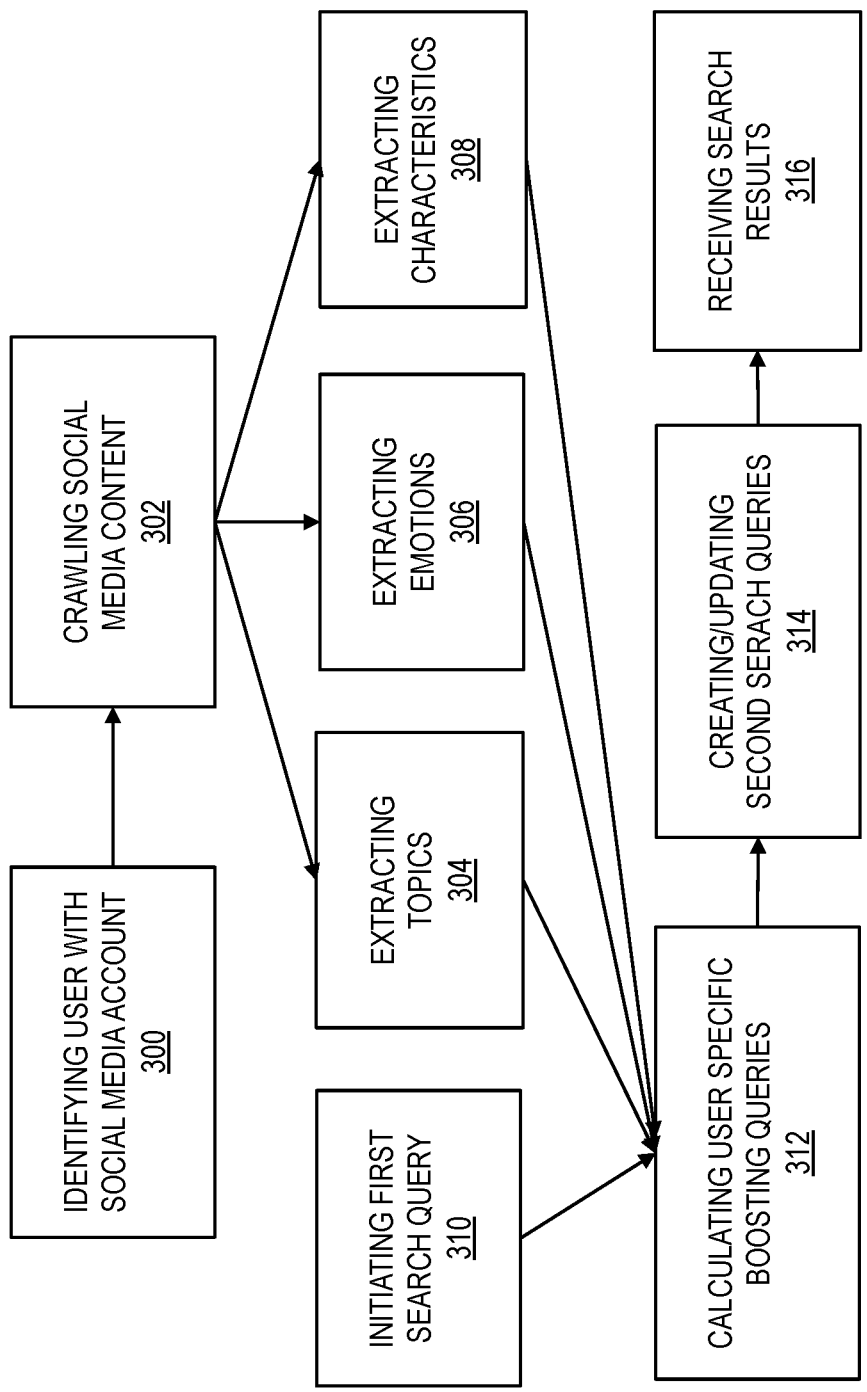
FIG. 6 is a schematic flow diagram of an exemplary method for personalizing a search of a search service using social media services, in accordance with an embodiment of the present invention.

FIG. 6 depicts a schematic flow diagram of an exemplary method for personalizing a search of a search service using social media services.

In block 300, the personalization component identifies the user in the social media sources using one or more social media accounts. The data regarding the respective social media accounts is, e.g., provided by the respective user. The user may identify his or herself with the respective social media accounts and allow the search engine to identify and crawl posts of the user on the respective social media services like blogs, communities, and social platforms. Those accounts may also be used to identify "likes" or "dislikes" the user assigns to and/or expresses for social media contents as well as channels the user follows and/or subscribes to. In block 302, the personalization component uses a social media extractor configured for crawling the social media content identified in block 300, e.g., social media accounts of the user as well as social media content the user interacted with, e.g., liked, disliked, followed, and/or subscribed to. Thus, social media extractor may retrieve social media content items related to the respective user.

In block 304, the personalization component uses a relevant topics identifier to identify and extract keywords related to relevant topics from the retrieved social media content items. The relevant topics identifier may provide a map of the social media content items, e.g., documents comprised by the same, and their relevant keywords. In block 306, the personalization component uses a tone analyzer to identify emotions of the user, like anger, disgust, fear, joy, or sadness, expressed in the retrieved social media content items and extracts keywords related to the emotions of the user. Thus, a map of the social media content items, e.g., documents comprised by the same, and emotions of the user related to these content items may be provided.

In block 308, the personalization component uses a personality insight component to achieve insight into characteristics of the user and to extract keywords related to the characteristics of the user. Such characteristics may comprise agreeableness, conscientiousness, extraversion, emotional. Insights may be provided in what the user prefers in general, summarized in categories, like excitement, harmony, curiosity, ideal, closeness, self-expression, liberty, love, practicality, stability, challenge, and structure. Thus, a map of the social media content items, e.g., documents comprised by the same, and personality of the user related to these content items may be provided.

In block 310, a first search query is issued. The first search query may, e.g., be issued by the search-based application. Using the first search query a set of one or more second search queries is determined as a first search result of the respective first search query. In block 312, a user specific boosting factor is calculated for each of the extracted keywords, e.g., based on frequencies, dates of activity and topics. In block 314, the second search queries of the user are enhanced with the user specific search boosting factors before forwarding the respective second search query to the search engine. In block 316, the search results of the one or more second search queries are provided to user, more precisely sent to the search-based application.

For example, the relevant topics identifier may identify in block 304 form social media activities of a user the following set of relevant topics: "dogs", "national parks", "Texas". The user may initiate a first search query in block 310 searching for "Houston". This may, e.g., result in a search query like "Content: Houston". For calculating boosting queries in block 312 a search factor calculator may use a named-entity recognition method to categorize terms comprised by the search query into pre-defined categories. This way the search factor calculator may be able to determine that "Houston" may refer to a place or a person. In block 314, a search result optimizer, e.g., using the named-entity recognition may determine that "national parks" and "Texas" are related to places, while "dogs" are not related to places. To determine boosting factors for the individual terms, the search factor calculator may count the occurrences of those terms in the recent social media activities of the user. For example, an occurrence in recent days may be ranked higher, than an occurrence longer ago, like weeks, months or years ago. The resulting boosting factors for an individual topic may be the higher, the more occurrences and the more recent occurrences of the respective topic in social media activities of the user are detected. Therefore, the search result optimizer in block 314 may boost search results which not only the keyword "Houston", but in addition the keyword "travel", "national parks" or "Texas", using the search boosting factors calculated in block 312. In other words, search results which not only comprise the keyword "Houston" as such, but rather a combination of the keywords "Houston" and "travel", "Houston" and "national parks", or "Houston" and "Texas", may be boosted relative to search results only comprising the keyword "Houston".

The content items, e.g., documents, available for searching in the search index may have been analyzed at indexing and assigned with a tone factor and/or a personality factor identifying emotions and/or personality characteristics related to the respective content items. A search result optimizer may compare, in block 314, the maps received in blocks 304, 306, and 308 in order to correlate the keywords extracted in block 304 with the emotions extracted in block 306 and the personality extracted in block 308. Thus, the search result optimizer further enabled to boost search results, i.e., content items, that better match emotions and personality of the user in view of the aforementioned keywords. In a further example, social media activities relating to the relevant topics "travel", "national parks" and "Texas" may express an emotional state of "joy" and relate personality characteristic of "practicability". A second search query may thus be updated to take into account the relevant topics as well as emotions and personality characteristics related to those topics in form of one or more boosting sub-query added to the original first search query or a second search query in order to provide an updated second search query enabling a personalized search taking into account individual preferences, emotions and personality characteristics of a user. The resulting updated second search query may, e.g., have the following form: "Content: Houston OR (Content: Houston AND Content: travel)^4.0 OR (Content: Houston AND Content: national parks)^2.0 OR (Content: Houston AND Content: Texas)^3.0 OR AND tone: joy AND personality: practicality". A search result may provide list with those content items found for the term "Houston" in relation "travel," "national parks," or "Texas" in a more prominent place based on the numerical factors assigned to these keywords as boosting factors in the sub-queries. Thus, the search result may better meet individual preferences and needs of the user.

It is understood that one or more of the aforementioned embodiments of the invention may be combined as long as the combined embodiments are not mutually exclusive.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for personalizing a search of a search service comprising:
retrieving, by one or more computer processors, one or more social media content items from the one or more social media services by a personalization component;
forwarding, by one or more computer processors, the retrieved social media content items by the personalization component to a content analyzing service configured for extracting keywords from the social media content items;
receiving, by one or more computer processors, by the personalization component a set of one or more keywords extracted from the social media content items from the content analyzing service;
determining, by one or more computer processors, a content item of a search query type comprising a second search query to be modified using the set of keywords;
modifying, by one or more computer processors, the determined second search query, wherein the modifying comprises adding one or more keywords of the set of keywords as additional search parameters of the determined second search query;
storing, by one or more computer processors, the modified second search query as a content item of the search query type in a search index of the search service;
calculating, by one or more computer processors, one or more boosting factors corresponding to the modified second search query based on extracted user emotions and user social propensities associated with the retrieved social media content items; and
adapting, by one or computer processors, one or more elements within a user interface of a search-based application program with the stored modified second search query and calculated boosting factors, wherein the associated boosting factors are provided as a numerical factor assigned to each keyword in the set of keywords, wherein the one or more elements within the user interface of the search-based application program are content items or menu items displayed in a view of the search-based application program.

2. The method of claim 1, wherein the search service and the personalization component are provided by a content management system, wherein the content management system further provides an authoring service which enables creating and editing content items managed by the content management system, wherein the authoring service is used for modifying of the determined second search query.

3. The method of claim 2, wherein the content management system further comprises the content analyzing service.

4. The method of claim 1, wherein the content analyzing service uses a concept extraction method for extracting the set of keywords, wherein the set of keywords represents characteristic semantic aspects of the retrieved social media content items.

5. The method of claim 1, wherein the content analyzing service uses an image tagging method for extracting the set of keywords.

6. The method of claim 1, wherein the content analyzing service uses a label extraction method for extracting the set of keywords.

7. The method of claim 1, wherein the content analyzing service uses a topic extraction method for extracting the set of keywords.

8. The method of claim 1, wherein the content analyzing service uses a tone analysis method for extracting the set of keywords.

9. The method of claim 1, wherein the content analyzing service uses personality insights for extracting the set of keywords.

10. The method of claim 1, wherein the content analyzing service uses a named-entity recognition method for extracting the set of keywords.

11. The method of claim 1, wherein the retrieved one or more social media content items relate to one or more social media activities of a user of a client application.

12. The method of claim 11, wherein the retrieved one or more social media content items are a subset of social media content items related to social media activities selected using dates of the respective activities.

13. The method of claim 11, wherein the retrieved one or more social media content items are a subset of social media content items related to social media activities selected using numbers of positive ratings of the respective activities.

14. The method of claim 11, wherein the retrieved one or more social media content items are a subset of social media content items related to social media activities selected using a clustering of users of the social media services comprising the user of the client application and associations of each of the users to the selected social media activities, wherein for the clustering of users is a distance measure over an analysis of a social graph.

15. The method of claim 1, wherein the extracted keywords are added to the determined second search query in form of one or more boosting sub-queries comprising the additional search parameters.

16. The method of claim 15, wherein the additional search parameters comprised by the boosting sub-queries are assigned with boosting factors for boosting second search results matching the additional search parameters.

17. The method of claim 1, further comprises:
a search service comprising a search engine and a search index, wherein the search index comprises content items of a search query type for use as first search results for first search queries received from a client application, wherein the content items of the search query type comprise second search queries for use by the search service to search for second search results to be returned to the client application as search results for the first search queries, wherein a personalization component is provided configured for retrieving one or more social media content items from one or more social media services.

18. The method of claim 1, further comprises:
receiving, by one or more computer processors, by the search service a first search query issued by the client application;
executing, by one or more computer processors, the received first search query by the search service;
retrieving, by one or more computer processors, the stored content item of the search query type providing the modified second search query as a first search result for the received first search query;
executing, by one or more computer processors, the modified second search query by the search service;
retrieving, by one or more computer processors, a set of content items as a second search result for the modified second search query; and
sending, by one or more computer processors, the second search result to the client application as a result of the received first search query.

19. A computer program product for personalizing a search of a search service comprising:
one or more computer readable storage media and program instructions stored on the one or more computer readable storage media, the stored program instructions comprising:
program instructions to retrieve one or more social media content items from the one or more social media services by a personalization component;
program instructions to forward the retrieved social media content items by the personalization component to a content analyzing service configured for extracting keywords from the social media content items;
program instructions to receive by the personalization component a set of one or more keywords extracted from the social media content items from the content analyzing service;
program instructions to determine a content item of the search query type comprising a second search query to be modified using the set of keywords;
program instructions to modify the determined second search query, wherein the modifying comprises adding one or more keywords of the set of keywords as additional search parameters of the determined second search query;
program instructions to store the modified second search query as a content item of the search query type in a search index of the search service;
program instructions to calculate one or more boosting factors corresponding to the modified second search query based on extracted user emotions and user social propensities associated with the retrieved social media content items; and
program instructions to adapt one or more elements within a user interface of a search-based application program with the stored modified second search query and calculated boosting factors, wherein the associated boosting factors are provided as a numerical factor assigned to each keyword in the set of keywords, wherein the one or more elements within the user interface of the search-based application program are content items or menu items displayed in a view of the search-based application program.

20. A computer system for personalizing a search of a search service comprising:
one or more computer processors;
one or more computer readable storage media; and
program instructions stored on the computer readable storage media for execution by at least one of the one or more processors, the stored program instructions comprising:
program instructions to retrieve one or more social media content items from the one or more social media services by a personalization component;
program instructions to forward the retrieved social media content items by the personalization component to a content analyzing service configured for extracting keywords from the social media content items;
program instructions to receive by the personalization component a set of one or more keywords extracted from the social media content items from the content analyzing service;
program instructions to determine a content item of the search query type comprising a second search query to be modified using the set of keywords;
program instructions to modify the determined second search query, wherein the modifying comprises adding one or more keywords of the set of keywords as additional search parameters of the determined second search query;
program instructions to store the modified second search query as a content item of the search query type in a search index of the search service;
program instructions to calculate one or more boosting factors corresponding to the modified second search query based on extracted user emotions and user social propensities associated with the retrieved social media content items; and program instructions to adapt one or more elements within a user interface of a search-based application program with the stored modified second search query and calculated boosting factors, wherein the associated boosting factors are provided as a numerical factor assigned to each keyword in the set of keywords, wherein the one or more elements within the user interface of the search-based application program are content items or menu items displayed in a view of the search-based application program.

* * * * *